No. 865,594. PATENTED SEPT. 10, 1907.
A. JENSEN.
COMBINED CHURN AND BUTTER WORKER.
APPLICATION FILED JUNE 28, 1907.
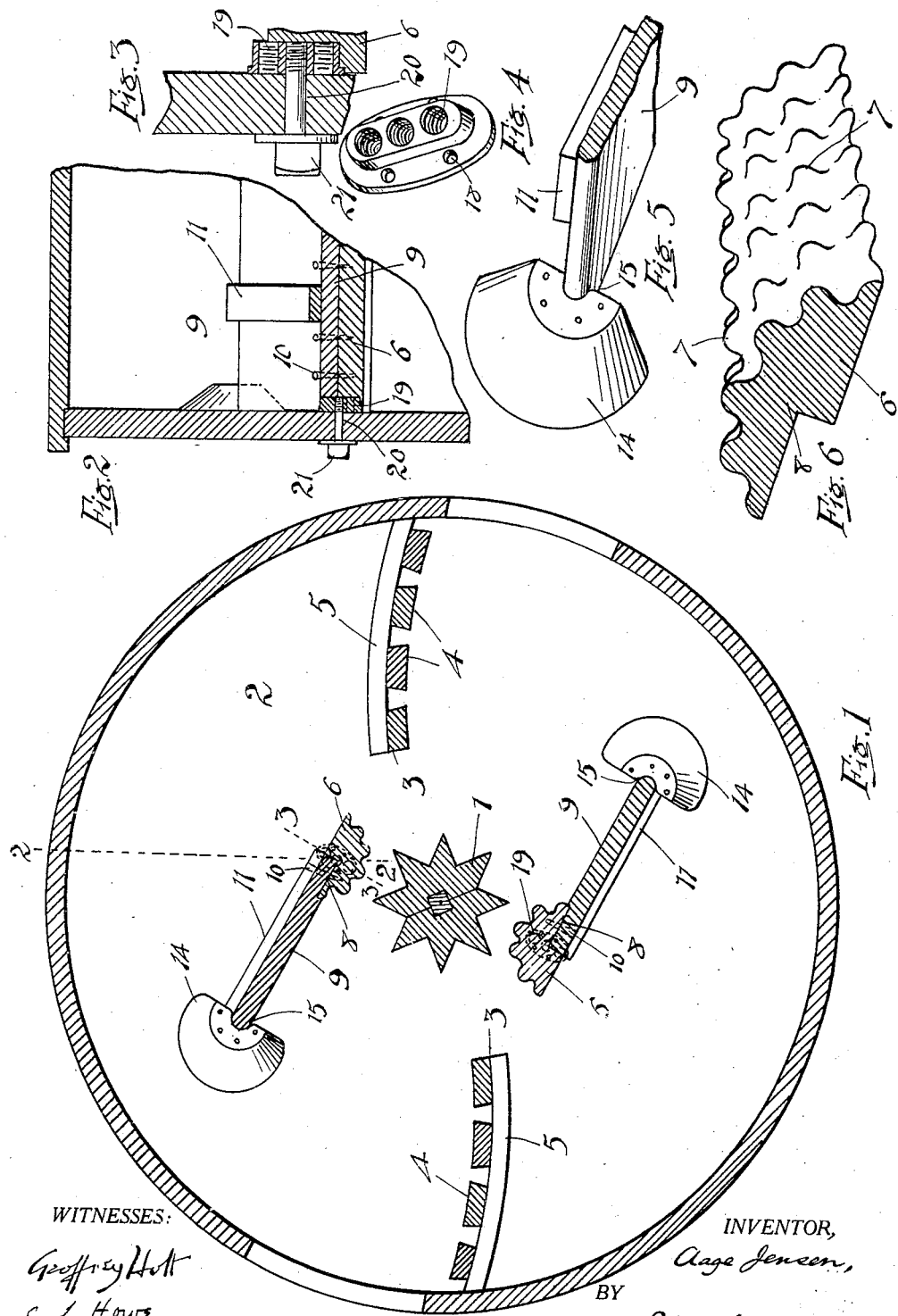
WITNESSES:
Geoffrey Holt
C. L. Howe.
INVENTOR,
Aage Jensen,
BY
J. M. Wright,
ATTORNEY.

UNITED STATES PATENT OFFICE.

AAGE JENSEN, OF EUREKA, CALIFORNIA.

COMBINED CHURN AND BUTTER-WORKER.

No. 865,594.

Specification of Letters Patent.

Patented Sept. 10, 1907.

Application filed June 28, 1907. Serial No. 381,200.

*To all whom it may concern:*

Be it known that I, AAGE JENSEN, a citizen of the United States, residing at Eureka, in the county of Humboldt and State of California, have invented new and useful Improvements in a Combined Churn and Butter-Worker, of which the following is a specification.

The object of the present invention is to provide a combined churn and butter worker, which can be readily adjusted for a large or a small charge of butter, and in which the number of moving parts may be as small as possible, in order to reduce the number of bearings for such movable parts.

The invention also resides in the novel construction, combination and arrangement of parts for the above ends, hereinafter fully specified and particularly pointed out in the claims.

In the accompanying drawing, Figure 1 is a cross section of the combined churn and butter worker; Fig. 2 is a broken longitudinal section on the line 2—2 of Fig. 1; Fig. 3 is an enlarged broken longitudinal section on the line 3—3 of Fig. 1; Fig. 4 is a detail perspective view of one of the socket plates; Fig. 5 is a broken detail perspective view of one of the pivot blocks, and of a portion of the guide plate therein; Fig. 6 is a sectional perspective view of one of the working plates.

In general arrangement the apparatus is similar to that disclosed in the U. S. Letters Patent granted to me May 28th, 1907, No. 855,178.

Referring to the drawing, 1 indicates a working roller, which is mounted on a shaft in precisely the same manner as disclosed in said Letters Patent, and between the heads 2 of the drum extend two butter shelves 3, diametrically opposite to each other, each shelf being formed of slats 4, spaced from each other, and supported at their ends upon concave ribs 5, secured upon the heads 2.

It has been a desired object with manufacturers of creamery machines to provide a combined churn and butter worker which can be adjusted for the size of the charge of butter which is to be worked. Unless the charges of butter are always of substantially the same size, devices of this character have been unsatisfactory in their working, as, when arranged so as to efficiently work a large charge of butter, they would be unsuitable for working a small charge, and conversely. I have discovered a construction by which this object can be obtained. Instead of the idler rollers disclosed in said Letters Patent above referred to, I now employ stationary working plates 6, which extend between the heads of the churn and are arranged on opposite sides of the working roller. These working plates are grooved both longitudinally and circumferentially, as clearly shown in Fig. 6, the projections between the grooves being in the form of round bosses 7. The rear side of each working plate is formed with a mortise or recess 8, adapted to receive the inner edge of a guide plate 9, also extending between the heads 2, and secured, as by wooden pins 10, to said working plate. At suitable intervals the guide plate is strengthened by cross pieces 11. The guide plate, cross pieces, and working plate thus form practically one piece. To adjustably secure this piece for the purpose of varying the distance between the working roller and the working plates, to conform to variations in the charge of the butter, there are secured, upon each head 2 of the churn, pivot blocks 14, formed with half round bearings 15 adapted to receive the rounded edges of the guide plates. Thereby each plate is permitted a slight angular movement while its rounded edge remains in engagement with said pivot blocks. Secured in the ends of the working plates, by means of screws through screw holes 18, are socket plates 19, each having a plurality of threaded sockets formed therein, three such sockets being here shown. One of said sockets is adapted to be moved into register with a bolt hole 20 through the end of the churn, through which a bolt 21 can pass and be screwed into said socket. Therefore, in order to vary the distance between the working plate and the working roller, the bolts are unscrewed so as to release the working plate, which is then moved to or from the working roller into the desired position, and the bolts are then screwed into those sockets which have been moved opposite thereto.

I find that the construction of the working plates 6 is such that, although stationary, they perform the function of working the butter equally as well as the idler rollers disclosed in said Letters Patent referred to, while at the same time affording the advantage of permitting adjustment of different sized charges of butter. In particular the rounded bosses or projections 7, in conjunction with the working roller 1, knead the butter and thoroughly work the same.

A further improvement embodied in this invention is the provision of the guide plates 9 which positively guide the butter between the working roller and the working plates. These guide plates can now be arranged to extend into contact with, and be connected to, the working plates.

I claim:—

1. In a combined churn and butter worker, the combination, with the body of a churn, of a working roller, a working plate stationarily secured at a distance from said working roller and formed with protuberances or bosses to work the butter, and means for adjusting the position of said working plate to a greater or less distance from the working roller, substantially as described.

2. In a combined churn and butter worker, the combination, with the body of a churn, of a working roller, working plates stationarily secured at a distance from said working roller and formed with protuberances or bosses to work the butter, and means for adjusting the position of said working plates to a greater or less distance from the working roller, substantially as described.

3. In a combined churn and butter worker, the combination, with the body of a churn, of a working roller, and a working plate stationarily secured at a distance from said roller and grooved longitudinally and circumferentially, the projections between the grooves being in the form of round bosses, substantially as described.

4. In a combined churn and butter worker, the combination, with the body of a churn, of a central working roller, working plates extending between the heads of the churn and spaced from said working roller, and guide plates also extending between said heads, each secured at its inner edge to the corresponding working plate, substantially as described.

In testimony whereof I have hereunto set my hand in the presence of two subscribing witnesses.

AAGE JENSEN.

Witnesses:
C. L. HOWE,
D. B. RICHARDS.